Nov. 19, 1957  H. C. LEHDE  2,813,430
LATITUDE CORRECTION SYSTEMS FOR STABLE ELEMENT
Filed June 2, 1954  2 Sheets-Sheet 1
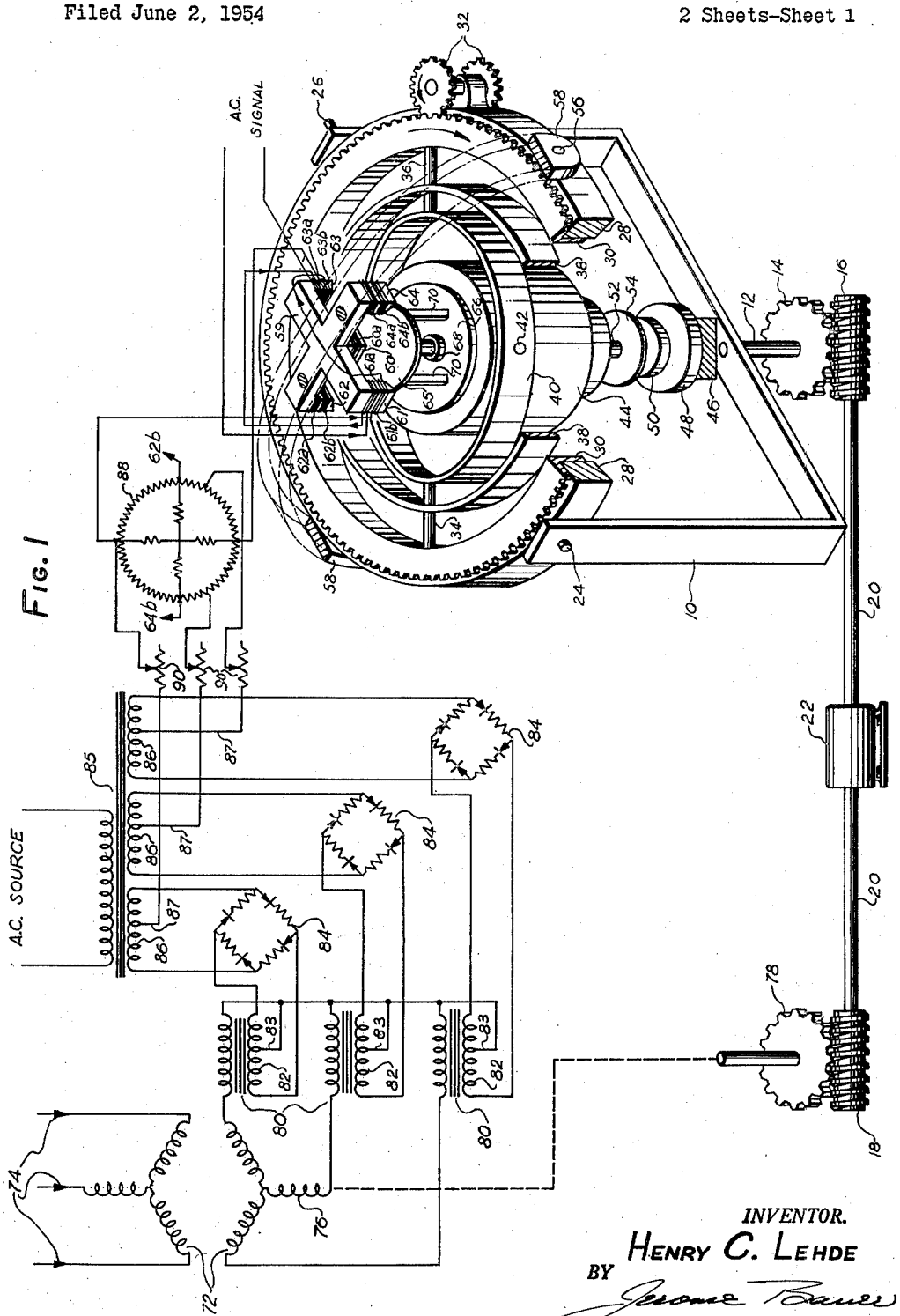
FIG. I
INVENTOR.
HENRY C. LEHDE
BY
ATTORNEY

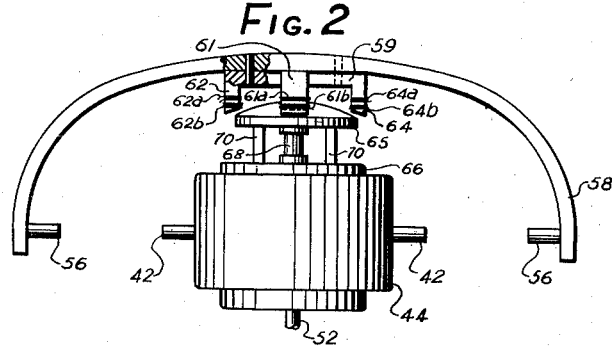
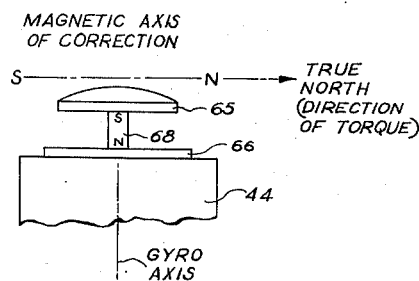
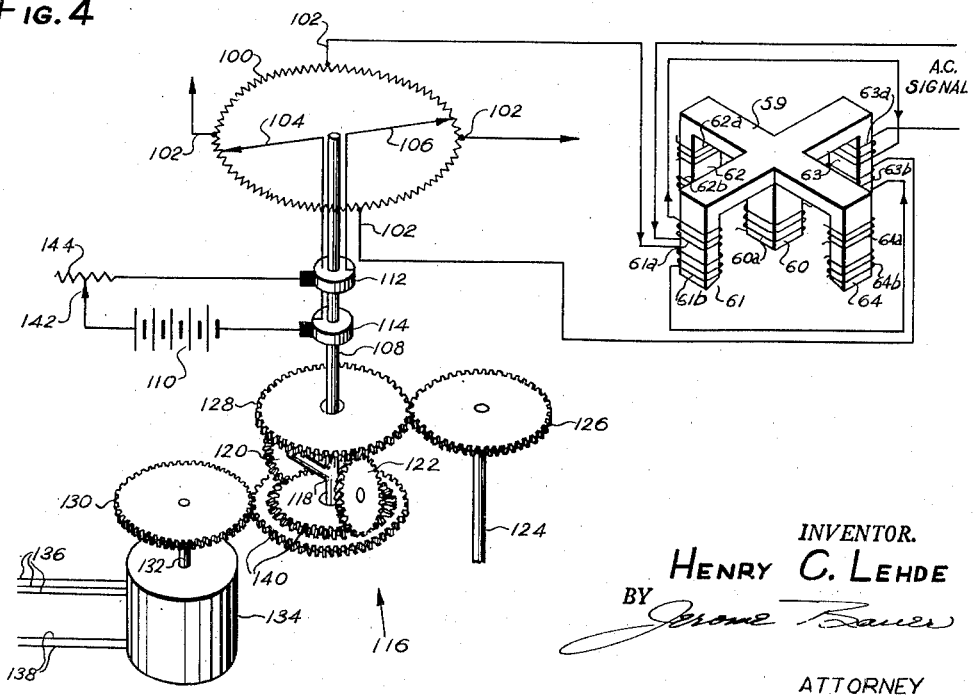

United States Patent Office 2,813,430
Patented Nov. 19, 1957

2,813,430

LATITUDE CORRECTION SYSTEMS FOR STABLE ELEMENT

Henry C. Lehde, Brooklyn, N. Y., assignor to Control Instrument Company, Brooklyn, N. Y., a corporation of New York Application June 2, 1954, Serial No. 434,055

5 Claims. (Cl. 74—5.4)

The invention relates to latitude correction systems for vertical gyroscopes.

Gyroscopes employed for the purpose of maintaining an accurately fixed vertical line of reference on a ship or aircraft are generally termed "stable elements." The axis of rotation of a gyro used as a stable element must remain in a vertical position, that is, point toward the center of the earth, at all times. However, once a gyro has started spinning it will retain the direction of its axis in space until it is acted upon by some external force. For this reason the axis of the gyro will tend to drift or deviate angularly from the vertical as the earth rotates. Thus, if a gyro is placed on the earth's equator with its axis pointing vertically at a given time, and no corrective force is applied thereto, it will be found that after the earth has rotated 90° the gyro axis now will be disposed horizontally with its axis pointing west (this being parallel to the initial position of the gyro axis in space).

To keep the gyro vertical with its axis directed toward the center of the earth at all times, a force must be applied to precess the gyro axis to the east, assuming clockwise rotation of the gyro as viewed from above. Generally, this is accomplished by an adjustable weight system mounted on a rotor of a latitude correction motor attached to the gyro case. The rotor is so turned that the resultant weight always lies on the north side of the gyro axis and applies a continual force in that direction. This force applied by the weight in the northerly direction exerts a torque on the gyro axis toward the east to precess the axis of the gyro in the direction of the center of the earth.

It is evident that such an arrangement is expensive and troublesome. It involves making electrical connections by flexible leads across several gimbal ring bearings which must be free of any appreciable friction. Slip rings are required to maintain connections to all of the rotating gimbal system, while a synchro differential unit is needed to correct the latitude motor position for rotation of the gimbals. Furthermore, different amounts of corrective torque are required at different latitudes; hence in those devices employing the adjustable weight system, the position of the weight has to be varied along a plane perpendicular to the axis of the rotor on which it is mounted as the gyro moves from one latitude to another. It is well known that this type of correction is a delicate procedure requiring a comparatively high degree of skill and care.

An important object of the present invention is to provide latitude compensation or correction by applying a known and adjustable magnetic pull to the gyro. The advantages of this arrangement are the elimination of the latitude motor and the synchro differential unit with all the slip rings and flexible leads required for their operation.

Another object of this invention is to eliminate the delicate latitude correction procedure of prior art devices by providing a device in which adjustments for variations in latitude are made conveniently and rapidly by simply varying the current in an electromagnet.

Another very important object of this invention is to provide an improved latitude correction means of the magnetic type which is adapted to utilize the same coil supporting member and the same armature as are utilized by the existing pickup or followup coils of the gyro. This enables the construction of vertical gyros to be simplified in a manner which has not been possible heretofore.

Other objects and advantages of the invention will be pointed out in the following description and claims and illustrated in the accompanying drawings, which disclose, by way of example, the principle of the invention and the best mode, which has been contemplated, of applying that principle.

In the drawings:

Fig. 1 is an isometric showing of a gyro mounted in its support to illustrate the pinciples of my invention, Fig. 2 is a side view of the top portion of the gyro shown in Fig. 1, Fig. 3 is a diagrammatic view showing the manner of exerting torque on the axis of the gyro, according to the invention, Fig. 4 is a diagrammatic showing of a modified apparatus for supplying controlled direct current to effect latitude correction on a stable element of the type shown in Fig. 1.

Referring now to Figs. 1 and 2, there is shown a stable element constructed in accordance with the principles of my invention. In Fig. 1 the generally U-shaped bracket or training frame 10 is fixed to rotate with the vertical shaft 12. Fixedly mounted on the shaft 12 is a worm wheel 14 which is reversibly rotatable by the worm 16. Driving the worm 16 and the worm 18 through the shaft 20 is the reversible motor 22 whose operation is controlled by a fire control servo, not shown, and which does not form a part of the present invention. By operating the motor 22, the bracket 10 may be rotated to any desired angular setting in any desired direction. The drive mechanism just described is employed to position the gyroscope and the associated gimbal system, to be described, to a desired train angle, also known as director train.

Mounted on each one of the upstanding arms of the bracket 10 are the pivots 24 and 26, respectively. The cross level ring 28 is fitted between the two arms of the bracket 10 and is mounted for pivotal movement on the pivots 24 and 26. Seated for rotary movement on the ring 28 is the circular gimbal drive ring 30. A pinion device 32, which is mounted on the level ring 28 to mesh with and to continuously rotate the drive ring 30, is driven by a small motor (not shown) attached to the under side of the cross level ring 28.

Two pivot shafts 34 and 36 are each fixed at one of their respective ends to diametrically opposite points of the interior of the gimbal drive ring 30. A circular gimbal ring 38 known as the pendulum gimbal ring, is pivotally mounted intermediate the ends of both of the shafts 34 and 36 while the elliptically shaped gyro gimbal 40 is mounted for pivotal movement on the ends of each of the shafts 34 and 36. Pivotally mounted within the gyro gimbal 40, on two pivots 42 (one of which is shown in Fig. 1 and both of which are shown in Fig. 2), is the gyro case 44. The gyroscope itself is not visible since it is enclosed by the case 44. However, at portions of this disclosure the reference numeral 44 may be used interchangeably to identify either the gyro case or the gyroscope mounted therein.

A semicircular pendulum bail 46 (which appears only in cross-section in Fig. 1) is suspended from and pivoted on the pendulum gimbal 38. Mounted on the bail 46 are the pendulum weight 48 and the magnet 50, both of which are normally situated directly under the gyro 44 and at the lowest portion of the bail 46. Both the pendulum gimbal 38 and the pendulum bail 46 have been cut away in Fig. 1 of the drawings so that only a cross-section of the bail 46 is visible, as mentioned above, while the pivots which pivotally connect the bail 46 to the ring 38 are not visible. As a result of the double pivot connection, namely, between the ring 38, the shafts 34 and 36, and the bail 46 with the ring 38, the pendulum has freedom of motion about two axes which are at right angles to each other. The pendulum, therefore, will oscillate freely about a vertical axis, and its average position will be a true vertical. Moreover, the gyro and gyro case 44 will have universal movement.

Extending downwardly from the gyroscope mounted within the case 44 is the gyro shaft 52, which is rotated with the flywheel of the gyroscope. An eddy current disc 54, attached to the lower end of the gyro shaft 52, is caused to rotate by the shaft 52 at a high speed in the magnetic field produced by the pendulum eddy current magnet 50. The function of the eddy current disc 54 and the magnet 50 is to precess the gyro into alignment with the magnet 50 thereby to establish a vertical reference line. Thus, if the eddy current disc 54 and magnet 50 are not in vertical alignment, the eddy currents produced in the rotating, misaligned disc will tend to precess the gyro into alignment with the magnet to establish a vertical reference line. This function, generally known in the art as pendulum precession, forms no part of the present invention, hence further elaboration in the instant disclosure is deemed unnecessary.

Extending over the top portion of the stable element and pivotally connected to the cross level ring 28, as by pins 56, is the semicircular level bail 58. In Fig. 1 the center portion of the level bail 58 has been cut away and is shown in dot-dash lines; however, in Fig. 2 the level bail 58 is shown in full. A cruciform member 59 of magnetic material, having five depending legs or pole pieces numbered 60 to 64, inclusive, is suspended from the underside of the level bail 56 in any suitable manner to provide a magnetic support for certain coils which will be described later.

An armature 65 of soft iron or the like is adapted to cooperate magnetically with the depending pole pieces of the cruciform 59. Mounted in a vertical position between the soft iron armature 65 and a magnetic shielding plate 66 on the upper end of the gyro case 44 is a small permanent magnet 68. The armature 65 is dome shaped and is supported above, and spaced from the gyro case 44 by the posts 70. It is also spaced from the lower ends of the five legs 60 to 64, inclusive, of the cruciform 59 a sufficient distance to allow the level bail 58 complete freedom of movement. The relative position of the armature 65, permanent magnet 68 and magnetic shield plate 66 causes the armature 65 to assume one magnetic polarity, while the plate 66 assumes the other.

Positioned about each one of the pickup legs 61 to 64 are two coils which are identified respectively by the letters "a" and "b" added to their respective pickup leg identifying numbers. The coils 61a, 62a, 63a and 64a carry alternating current, while coils 61b, 62b, 63b and 64b carry direct current. The center leg or exciter pole 60 of the pickup cruciform 59 is energized by a coil 60a carrying alternating current which sends a magnetic flux into the armature 65. The alternating magnetic flux returns by way of the four outer pickup poles 61 to 64, thereby linking the signal pickup coils 61a, 62a, 63a and 64a. The diametrically opposite signal pickup coils 61a and 63a, and 62a and 64a are paired and connected in series opposition. This paired connection is only partially shown in the drawings (see Fig. 1) wherein the coils 61a and 63a are connected in series opposition. To avoid confusing the illustration, the paired coils 62a and 64a are not shown to be connected in the drawing; however, in practice they will be similarly connected.

The function of the pickup member 59 is to maintain the level and cross level members 58 and 28 respectively stabilized with respect to the gyro 44 at all times. This stabilized condition is accomplished in the following manner. If the armature 65 is displaced slightly from alignment with the center or exciter leg 60 of the pickup frame 59, the lines of flux in any one pickup leg or a combination of legs of the frame 59 toward which the armature 65 moves, will be greater than in the opposite pickup leg or legs. The resultant A. C. signal, being responsive to the variations in the lines of flux, will be an indication of the magnitude and direction of the displacement of the pickup frame 59 from the vertical axis established by the gyro 44 and the armature 65. The resultant, paired A. C. signals sent from the pickup member 59 are transmitted to respective servo amplifiers, not shown, each of which operatively controls a servo-motor, likewise not shown. The servo-motors, when operated, effect rotation of the semicircular bail 58 about the pivots 56 to maintain the pickup member 59 in stable vertical alignment with respect to the axis of the gyro 44 and the armature 65.

The amplifiers and servo-motors are not shown in the drawings because they do not constitute a part of the invention. However, a brief description of their functions is believed helpful. One of the servo-motors is used to position the level bail 58, the other servo-motor is used to position the cross level ring 28. It is to be understood that operation of the servo-motors, through their respective gearing, maintains the pickup member 59 in accurate vertical alignment with the armature 65 directly beneath it. The magnetic shielding plate 66 placed over the gyro case 44 aids to prevent stray magnetic flux coming from the gyro from inducing any appreciable disturbing voltage in the pickup coils 60 to 64, inclusive, on the member 59.

As noted previously, to precess the gyro for overcoming its tendency to stay fixed in space, so that its axis will be directed constantly toward the center of the earth, a force must be exerted upon the gyro axis in a certain direction. Assuming clockwise rotation of the gyro, this force must be in a northerly direction. In the instant invention the corrective force just referred to is applied by the combination of the permanent magnet 68 and the electromagnet comprising the coils 61b, 62b, 63b and 64b and the member 59, and this force is directed always toward the north, regardless of the train angle of the stable element.

When the stable element is used in a ship, a synchro transmission (not shown) receives the indication of the ship's course from a gyro compass transmitter, also not shown. The transmitted signals representing ship's course are indicated in Fig. 1 by the arrows 74. A differential generator 72 responds to these signals. The rotor 76 of the differential generator 72 is attached to the worm wheel 78 and is turned by the motor 22 in unison with the rotation of the bracket 10. The indications of the ship's course are thus modified by the train angle, represented by the angular position of the bracket 10. The voltages generated by the generator 72 are applied to the three small transformers 80, each of which has a secondary 82 with center taps 83. The center taps 83 and the voltages of the secondaries 82 are applied to opposite corners of the three ring type demodulators or phase sensitive rectifiers 84. The three demodulators 84 convert the applied A. C. voltages to D. C. voltages of corresponding polarities.

A transformer generally indicated at 85, is energized from the A. C. supply used for the gyro compass transmitter, mentioned previously. Biasing voltages are applied to the three demodulators 84 from the three secondaries 86 of the transformer 85. The D. C. outputs of the three demodulators 84 are taken from the center taps 87 of the bias windings and are applied to the four D. C. coils 61b, 62b, 63b and 64b of the four pickup legs 61 to 64, respectively, on the frame 59 by way of the continuous resistor winding 88. The diametrically opposite D. C. coils 61b and 63b, and 62b and 64b are connected in series aiding, but for the sake of clarity only coils 61b and 63b are shown to be so connected in Fig. 1. It will be understood that the D. C. coils 62b and 64b also are connected in series aiding to each other and are respectively connected to winding 88 at the points indicated by the arrow heads 62b and 64b, Fig. 1. The magnetic field produced in each of the pickup legs 61 to 64 of frame 59 by the rectified voltages derived from the stator of the generator 72 will be a D. C. field instead of the A. C. field ordinarily produced in a synchro stator. The magnetic field resulting from the combined effect of the D. C. magnetic pole strengths of pickup legs 61 to 64 inclusive will rotate around the center leg 60 of the member 59 with a change in the synchro indication in the same manner as will an A. C. field in synchro.

The generator 72 is adjusted so that the magnetic poles of the resultant magnetic field produced by the cruciform member 59 are in a north-south line. Inasmuch as the indications of the ship's course are modified by train angle in the manner previously described, the differential generator 72 corrects the direction of the resultant magnetic field toward the north-south line from the indications of the ship's course. Thus, the magnetic poles of the resultant field produced by member 59 will remain in a north-south line, regardless of changes in the angular position of the bracket 10. Proper adjustment of the amount of direct current applied to each of the legs 61 to 64 of the member 59 will cause the induced magnetic field to exert a horizontal pull or force upon the armature 65 which will always be directed to the north regardless of the train angle of the stable element.

Provision is made for adjustment of the horizontal magnetic pull or force to correct for drift changes as there are changes in latitude. For this purpose three variable resistors 90 control the currents to the D. C. coils on the member 59. For convenience the resistors 90 may be mechanically coupled. It is to be understood, however, that the D. C. magnetic field of the member 59 should be made relatively strong in comparison to the earth's magnetic field. This will minimize any effect that the earth's magnetic field may have in producing a disturbing torque on the magnet 68.

In the operation of the latitude correction device shown in Fig. 1 it is necessary that the torque exerted on the axis of the gyro 44 by the magnetic field of the member 59 be directed constantly in a northerly direction and along a plane normal to the vertical axis of the gyro. To accomplish this function the member 59 must be in vertical alignment with the axis of the gyro 44 and the armature 65. In this stabilized position the constant magnetic field established by the direct currents supplied to the legs 61 to 64 of the member 59 will cooperate with the magnet 68 to exert a torque on the axis of the gyro 44 along a plane normal to the axis.

As noted previously, the member 59 is maintained in vertical alignment with respect to the gyro 44 and armature 65. This is effected by the variations which occur in the flux of the alternating current applied to the legs 61 to 64 as the gyro and armature move with changes in the ship's course. The variations in the A. C. flux passing between the energizer leg 60, pickup legs 61 to 64, and the armature 65 control the operation of servo motors which position the bail 58 so that the member 59 is vertically aligned with respect to the armature 65 and gyro 44. Direct current is supplied by the rectifiers 84 to the coils 61b, 62b, 63b and 64b on the same pickup legs 61 to 64. The magnetic field produced jointly by the D. C. coils on the legs 61 to 64 is substantially constant since the total applied direct current is substantially constant. However, as the ship's compass indicates variations in the ship's course, the variations so indicated will be transmitted to control the generator 72. In turn, the generator will apply the direct current to the pickup windings 61b to 64b to thereby move and correct the magnetic polarity in a north-south direction.

The stabilized condition is diagrammatically shown in Fig. 3, wherein the magnetic poles of the resultant field set up by D. C. excitation of the member 59 (not shown) are in a north-south line. Under these conditions the north magnetic pole of the resultant field attracts the south magnetic pole at the upper end of the magnet 68 to apply a torque along the vertical axis of the gyro 44. As shown in Fig. 3, the torque is applied in a northerly direction. Assuming clockwise rotation of the gyro 44, the resultant direction of precession of the gyro axis will be toward the east. In this manner the gyro axis will be precessed constantly toward the center of the earth to correct for gyro drift due to the earth's rotation.

As the ship moves from one latitude to another, gyro drift due to the rotation of the earth varies. It is necessary to compensate for such variations. To do this in the present instance, it is merely necessary to vary the amount of direct current applied to each of the coils 61b to 64b. The mechanically coupled resistors 90 will accomplish this function by simple adjustment. Thus, as the ship moves to a different latitude, the resistors 90 may be adjusted to control and vary the amount of direct current applied to the legs 61 to 64. This, in turn, controls the magnetic field in the member 59 and the degree of torque to be exerted on the axis of the gyro 44.

In Fig. 4 there is shown a modified apparatus for supplying controlled direct current to a latitude correction device for the purpose of establishing an external magnetic field which can be continuously varied in direction. The cruciform member 59 is shown with the modified apparatus in Fig. 4 to illustrate the operation of the apparatus more clearly. Member 59, with its five depending legs 60 to 64, inclusive, corresponds to the member 59 of the latitude correction device shown in Figs. 1 and 2, and the two pairs of alternating current carrying coils 61a and 63a, and 62a and 64a are each connected in series opposition to the A. C. source as previously described. The direct current carrying coils 61b and 63b, and 62b and 64b are similarly connected in series aiding, as described before.

When the cruciform 59 is employed in conjunction with a current source of the type shown in Fig. 4, the direct current coils 61b, 62b, 63b and 64b are connected to the circular or toroidal potentiometer 100 by the four equidistantly spaced taps 102. In Fig. 4 only the coils 61b and 63b, connected in series aiding, are shown connected to potentiometer 100 while the taps 102 will be connected by suitable conductors (indicated by the arrows) to coils 62b and 64b. Brushes 104 and 106 are mounted diametrically opposite to each other on a shaft 108 to supply direct current from any suitable D. C. power source 110 to the potentiometer 100. Current from the source 110 is continuously conducted to the potentiometer brushes 104 and 106 by way of the slip rings 112 and 114, respectively. The voltage drops existing between the four taps 102 on the potentiometer 100 will supply direct currents to each of the D. C. coils on the legs 61 to 64 of the member 59. It will be understood that the respective currents supplied to these coils will vary as the brushes 104 and 106 are rotated. Thus, as the potentiometer brushes 104 and 106 are moved about the potentiometer 100, the varying excitations applied to the legs 61 to 64 of the member 59 will cause the north-south magnetic poles of the resultant field to move about the center of the member 59 and occupy positions which correspond respectively to the positions of the brushes 104 and 106 on the toroidal potentiometer 100.

Shaft 108 is driven by a differential drive unit, generally identified by the numeral 116, which correctly positions and moves the shaft 108 in accordance with the combined indications of the ship's course and train angle as follows: The lower end of shaft 108 is formed integral with the differential drive shaft 118. At each end of the differential drive shaft 118 there is mounted a vertically disposed output bevel gear 120 or 122, respectively. Input shaft 124 is rotated in accordance with the position of the U-shaped bracket 10 of the stable element shown in Fig. 1. The input gear 126, mounted on the shaft 124, rotates the differential bevel drive gear 128 having bevel gear teeth (not shown) which engage with and drive the two output bevels 120 and 122.

The other input to the differential unit 116 is furnished by the gear 130 fixed to rotate with the input shaft 132. Shaft 132 is caused to rotate in accordance with the indications of the ship's course which is received by the synchro motor 134 from the conductors 136 leading to the ship's gyro compass transmitter (not shown). Conductors 138 connect the synchro motor 134 with a suitable source of power. Rotation of the input gear 130 causes the rotation of the differential bevel drive gear 140 which, through its bevel teeth drive the two output bevels 120 and 122. Thus the inputs of train angle and the indications of the ship's course are combined in the differential unit 116. The shaft 108 is driven by the output of the differential unit 116 and the resultant output of the potentiometer 100 represents the rotation of the gyro frame or bracket 10 (see Fig. 1) with respect to a north-south line.

The north-south poles of the magnetic field jointly produced by the legs 61 to 64 of the member 59 can be maintained in a north-south line by originally adjusting the shaft 108 to the proper north-south zero setting. The movable arm 142 may be adjusted along the variable resistor 144 to vary the D. C. excitation, thereby to compensate for changes of position in latitude.

The operation of the latitude correction device, when controlled by the apparatus illustrated in Fig. 4, is the same as that described with respect to Figs. 1 and 2. The cruciform 59 is vertically aligned with the armature 65 and the axis of the gyro 44 (neither of which are shown in Fig. 4) by the A. C. flux in the manner described in the operation of Figs. 1 and 2. The constant direct current supplied from source 110 is divided among the coils 61b, 62b, 63b and 64b by the potentiometer 100 and the four leads 102. The applied currents are so proportioned that the axis of the magnetic field is directed constantly in the north-south line, as determined by the angular position of the brush shaft 108. Positioning of the brush shaft 108 is effected under the control of the differential unit 116 which is responsive to, and controlled by the information furnished by the ship's compass and the train angle indicator.

As the ship moves from one latitude to another, the current supplied to the D. C. coils of the member 59 may be varied by adjustment of the arm 142. In this manner the strength of the resultant magnetic field may be varied to vary the degree of torque which will be exerted on the gyro axis.

From the foregoing it will be apparent that the described latitude correction device and its principles of operation can be applied to vertical gyros wherever an inexpensive, simple and efficient type of latitude compensation is required.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended thereto.

The invention is claimed as follows:

1. In combination with a vertical gyro, apparatus for preventing drift of the gyro axis due to rotation of the earth, said apparatus comprising a magnetized element having a fixed magnetic polarity supported on said gyro, a magnetic member supported for lateral movement relative to said magnetized element but normally occupying a stable position in alignment therewith, conductor coils mounted on said magnetic member in spaced relation to each other, and means for supplying direct current excitation to said conductor coils in a selective manner to establish a magnetic field of fixed spatial polarity coacting with said magnetized element to precess the gyro in a given direction.

2. The apparatus recited in claim 1, wherein the means for supplying direct current excitation is adjustable both as to the relative excitations of said conductors coils and as to the total intensity of the direct current excitation, thereby enabling the amount of precession to be controlled in accordance with changes of latitude.

3. In combination with a vertical gyro, apparatus for preventing drift of the gyro axis due to rotation of the earth, said apparatus comprising a magnetized element having a fixed magnetic polarity supported on said gyro, a magnetic member supported for lateral movement relative to said magnetized element but normally occupying a stable position in alignment therewith, said magnetic member having legs disposed in spaced relation to each other, exciter coils mounted on the legs of said magnetic member, and means for supplying direct currents respectively to said exciter coils in selected amounts to establish a magnetic field of fixed spatial polarity coacting with said magnetized element to precess the gyro in a given direction.

4. In combination with a vertical gyro, apparatus for preventing drift of the gyro axis due to rotation of the earth, said apparatus comprising an armature supported on said gyro in alignment with the axis thereof, means for magnetizing said armature with a constant polarity, a magnetic member supported for lateral movement relative to said armature but normally occupying a stable position in alignment therewith, said magnetic member having legs disposed in spaced relation to each other, and means for supplying direct current excitation to said legs in a selective manner to establish a resultant magnetic field coacting with said polarized armature to precess the gyro in a given direction.

5. The apparatus recited in claim 4, wherein the means for magnetizing said armature comprises a permanent magnet supported on said gyro with its poles on the gyro axis, said armature being adjacent to one of the permanent magnet poles.

References Cited in the file of this patent

UNITED STATES PATENTS

| 2,552,132 | Anderson | May 8, 1951 |
| 2,676,491 | Johnson | Apr. 27, 1954 |